(12) United States Patent
Gilbert

(10) Patent No.: US 6,457,099 B1
(45) Date of Patent: Sep. 24, 2002

(54) PROGRAMMABLE DEDICATED APPLICATION CARD

(76) Inventor: David A. Gilbert, 4931 Ohio St., S. Charleston, WV (US) 25309

(*) Notice: Subject to any disclaimer, the term of this patent is extended or adjusted under 35 U.S.C. 154(b) by 0 days.

(21) Appl. No.: 09/384,046

(22) Filed: Aug. 26, 1999

Related U.S. Application Data

(60) Provisional application No. 60/098,091, filed on Aug. 27, 1998.

(51) Int. Cl.[7] .............................................. G06F 13/10
(52) U.S. Cl. ...................................................... 711/115
(58) Field of Search ................................ 711/103, 115, 711/154, 147

(56) References Cited

U.S. PATENT DOCUMENTS 6,308,255 B1   10/2001   Gorishek, IV et al. ...... 712/209

OTHER PUBLICATIONS

Caron et al., "New architectures for smart cards: the ocean approach", 1994, p 148–155, IEEE.*

* cited by examiner

Primary Examiner—Kevin L. Ellis
(74) Attorney, Agent, or Firm—Steptoe & Johnson PLLC (57) ABSTRACT

A programmable dedicated application card is invented comprising one or more EPROMs for storing a software application, an EEPROM storing a Host Control Program (HCP) for interfacing with a Client Interface Program (CIP) executing on a host computer system, an appropriate amount of SRAM for executing and shadowing the software application, a small amount of DRAM for use as a cache for user-data during execution of the software application, and a reduced instruction set code (RISC) processor that accesses the SRAM to execute the software application and send the results to the user via the local computer system. The PDAC is simply "plugged into" a host computer system such that when desired, the user accesses and executes the software application directly from the PDAC, thereby saving local computer resources, e.g., processor and memory, and making those resources available for other tasks. The CIP of the host computer system makes available to a user the different software applications of the local PDACs as well as the software applications available from remote PDACs.

29 Claims, 9 Drawing Sheets

PROGRAMMABLE DEDICATED APPLICATION CARD

CROSS-REFERENCE TO RELATED APPLICATIONS

This application claims the benefit of Application Ser. No. 60/098,091, filed Aug. 27, 1998.

BACKGROUND OF THE INVENTION

1. Field of the Invention

This invention relates to computer hardware and software, and more specifically to a programmable computer card storing one ore more dedicated software applications.

2. Related Art

Using conventional computer hardware and software, a user accesses a software application on a local computer by executing the application from the local hard drive or from a network server while accessing the computer's main memory. However, there are many disadvantages with both arrangements. When executing an application locally, the application uses the local computer's resources; e.g., the processor(s) and memory. Therefore, the computer resources are not available to perform other tasks. When executing an application remotely via a network server, the local computer's resources may be freed up and available for other use; however, the user typically experiences a degradation of performance speed.

Therefore, there is a need for a means by which a user may execute an application locally that frees up the resources of the local computer, thereby making the resources available for multiprocessing or multitasking. There is also a need for a means by which a user may access an application remotely such that execution speed is not diminished.

Many software applications are used in connection with very sensitive data such that the application software must be protected from hackers as well as from viruses. Therefore, there is also a need for a means by which a user can execute an application locally that not only frees up local resources, but also is free from viruses and others tampering.

SUMMARY OF THE INVENTION

The present invention solves the current problems associated with the execution of conventional software applications through the use of a programmable dedicated application card (PDAC). A PDAC is a computer card that comprises one or more EPROMs for storing a software application, an EEPROM storing a Host Control Program (HCP) for interfacing with the host computer system, an appropriate amount of SRAM for executing and shadowing the software application, a small amount of DRAM for use as a cache for user-data during execution of the software application, and a reduced instruction set code (RISC) processor that accesses the SRAM to execute the software application and send the results to the user via the host computer system. The PDAC is simply "plugged into" a host computer system such that when desired, the user accesses and executes the software application directly from the PDAC. The present invention also allows access via a network to remote PDACs of other host computer systems.

There are many advantages associated with using a PDAC. First, there is an improvement to execution speed by running a software application on a RISC processor. Second, host computer resources are freed up for other tasks, therefore increasing performance of the host machine. For example, because the PDAC processor is executing and processing the software application, the host computer's processor and memory is available for assisting with input/output (I/O) tasks while still having power to spare. Therefore, the use of a PDAC increases the ability of the host computer system to handle multiprocessing and multitasking operations. In addition, when using multiple PDACS, wherein each PDAC is programmed with a different software application, e.g., a spreadsheet, a database, and a word processor, each application is executed on a dedicated processor, allowing the applications to execute in parallel with each other as well as in parallel with the host computer's main operating system. Furthermore, the amount of storage needed on the host computer system is reduced because the applications are stored on the PDACs.

Other advantages of the PDAC of the present invention include the software application's immunity to viruses. Because a software application is stored in EPROM, the application cannot be tampered with or otherwise tainted. Therefore, the application is very reliable. In addition, it is extremely easy and simple to upgrade any software application. Upon a new release, a user only has to remove the existing PDAC containing the old version of software and replace it with a new PDAC containing the new software upgrade. This means for upgrading is very helpful for those computer systems that are isolated due to high security precautions.

The advantages associated with a PDAC of the present invention change according to the installation configuration; that is, depending on whether the PDAC is incorporated into a host computer system only or whether the host computer system incorporating the PDAC is part of a network environment. If the host computer system is not connected to a network, the use of a PDAC functions as a hardware accelerator and enhances the capabilities of the host computer system.

When operating in a network environment, the use of remote PDACs results in additional advantages. For example, a host computer system is able to draw on the capabilities of remote processors, thereby increasing its processing power (as long as a cache coherency mechanism is in place to ensure data integrity). The result is a distributed computing system having greater processing power than any single node on the network.

BRIEF DESCRIPTION OF THE FIGURES

The present invention is described with reference to the accompanying drawing. In the drawing, like reference numbers indicate identical or functionally similar elements. Additionally, the left-most digit of a reference number identifies the drawing in which the reference number first appears.

DETAILED DESCRIPTION OF THE PREFERRED EMBODIMENTS

A. System Hardware/Software Configuration

Figure 1:
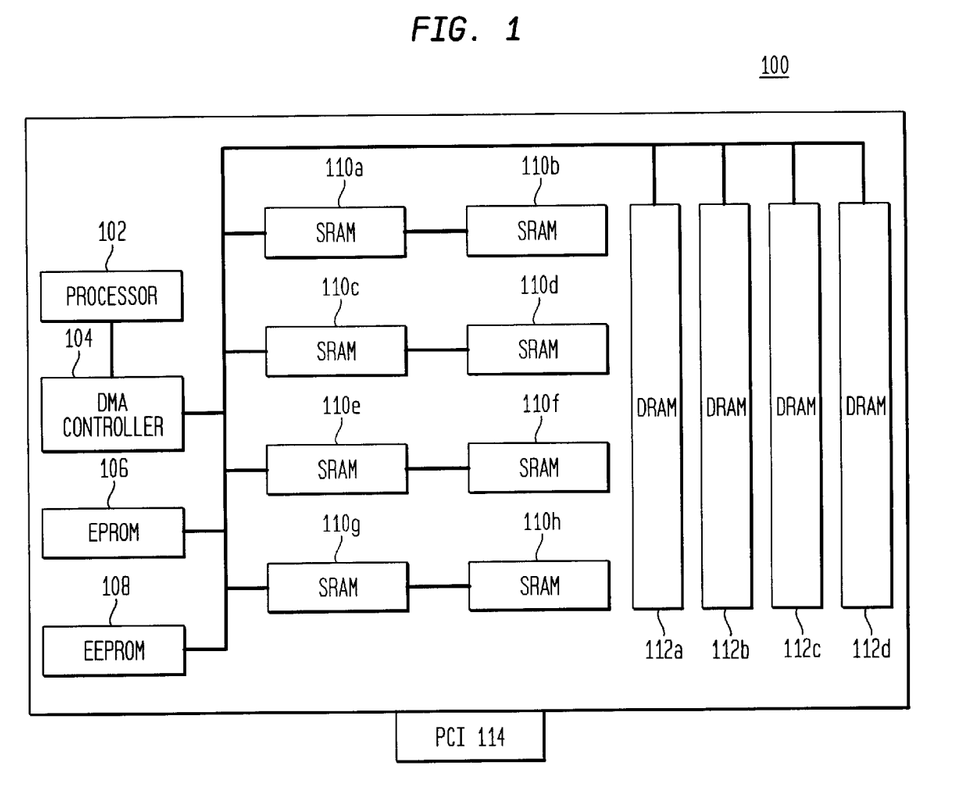
FIG. 1: A block diagram illustrating the hardware components of a programmable dedicated application card (PDAC) of the present invention.

FIG. 1 is a block diagram illustrating the hardware configuration of the preferred embodiment of a programmable dedicated application card (PDAC) 100 of the present invention. Operationally, a user plugs a PDAC 100 into a host computer system 200 which is described in greater detail below. The PDAC 100 is basically its own stand-alone computer system, comprising: a processor 102, direct memory access controller 104, an EPROM 106, an EEPROM 108, one or more SRAMs 110a–h as needed, one or more DRAMs 112a–d as needed, and a peripheral component interconnect (PCI) 114. In an alternative embodiment, the PDAC 100 may also incorporate one or more sockets in which auxiliary memory chips can be plugged in for processing large or multiple software applications.

In the preferred embodiment, the EEPROM 108 stores a Host Control Program (HCP), described in greater detail below, that is used to monitor and control the hardware and firmware resources of the PDAC 100, and to interface with other software programs executing on the host computer system 200.

Also in the preferred embodiment, a single software application is stored on EPROM 106 because EPROM 106 cannot be accidently reprogrammed. Therefore, the software application will be secure and virtually tamper-proof The use of an EPROM 106 for storing a software application is for convenience purpose only. It would be readily apparent to one of ordinary skill in the relevant art to store a software application on a comparable non-volatile hardware component, e.g., Flash RAM, Ferro-electric RAM, EEPROM, or a battery backed RAM. By storing a software application in a non-volatile memory, a PDAC 100 of the present invention will function and operate as intended. In addition, the preferred embodiment comprises a single software application per PDAC 100; however, this also is for convenience purpose only. A PDAC 100 of the present invention can store and execute multiple software applications.

In the preferred embodiment, the processor 102 employs a reduced instruction set code (RISC) architecture (wherein the processor 102 and DMA controller 104 are integrated into a single component) that accesses the various RAM via a DMA controller 104 to execute the software application. The processor 102 receives all input data and transmits all output data to the host computer system 200 via the PCI 114. The preferred embodiment of PDAC 100 uses a PCI 114 because it is a standard bus interface that supports high data rates. However, the use of a PCI 114 is for convenience purpose only. It would be readily apparent for one of ordinary skill in the relevant art to use a PDAC 100 of the present invention with any conventional bus as long as the PDAC 100 utilized the appropriate bus protocol.

Regarding the use of RAM, the preferred embodiment uses SRAM 110a–h and DRAMs 112a–d, but this is also for convenience purpose only. It would be readily apparent to one of ordinary skill in the relevant art to use another type of RAM, e.g., a concurrent type of RAM, single or dual port RAM, synchronous RAM, dynamic RAM, and the like. When the processor 102 of a PDAC 100 is executing the resident software application, in the preferred embodiment, the processor 102 shadows the software application to DRAM 112a–d and uses the SRAM 110a–h as a user data buffer, or cache. This use of the DRAMs 112a–d and SRAMs 110a–h is also for convenience only. A PDAC 100 of the present invention would function equally as well if the processor 102 shadowed an executing software application to SRAM 110a–h and used the DRAM 112a–d as the user data buffer. In either configuration, whichever memory, SRAM 110a–h or DRAM 112a–d, is used as the user data buffer, the memory is battery backed in the preferred embodiment to ensure it is non-volatile. Therefore, if power to the PDAC 100 is disrupted for any reason, the status of the software application is preserved until the power is restored.

The present invention is described in terms of a PDAC 100 having a single processor 102 for convenience purposes only. It would be readily apparent, however, for one skilled in the relevant arts to use a PDAC 100 having multiple processors 102 to execute the software application in parallel. There are also no memory requirements for developing and executing the present invention. However, the PDAC 100 achieves better performance with more SRAMs 110a–h and DRAMs 112a–d.

All components of the PDAC 100 as described herein are commercially available and their operation and interfaces are well known in the relevant arts. Further, it would be readily apparent for one of ordinary skill in the relevant art to design and manufacture a PDAC 100 of the present invention as described. In addition, the use of specific hardware components is for convenience purpose only, e.g., the use of a RISC processor. It would be readily apparent for one of ordinary skill in the relevant arts to use comparable hardware components and achieve the same functionality.

Regarding manufacturing of a PDAC 100 of the present invention, a PDAC 100 preferably will be laid out in such a way that only the necessary sockets are soldered to the board at manufacture. The remainder of the manufacturing process occurs in a manner consistent with the just-in-time production mode. Before shipping, EPROMs 106 and EEPROMs 108 are burned with the software application and HCP and the SRAM 110a–h and DRAM 112a–h are installed in the sockets.

Figure 2:
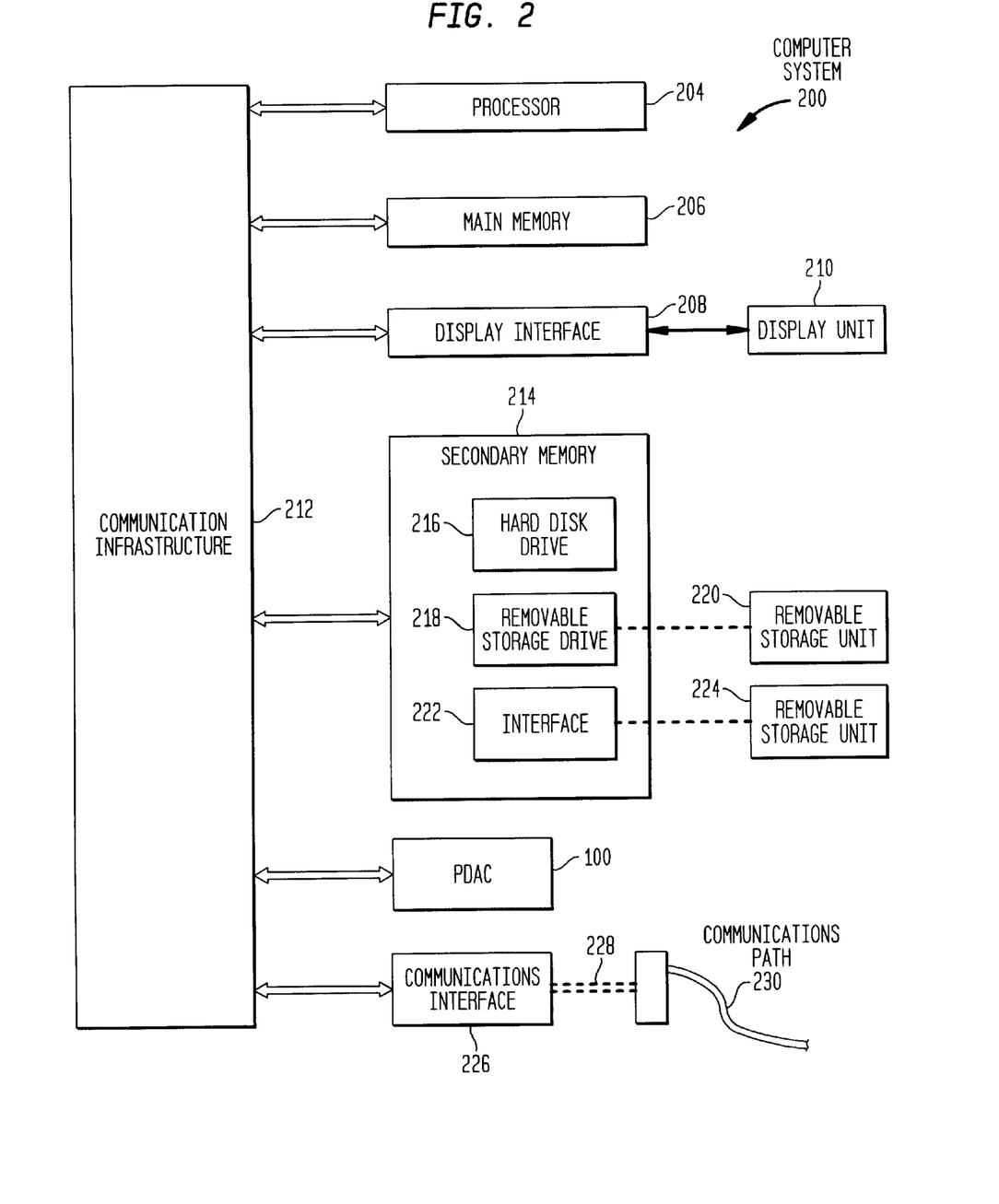
FIG. 2: A block diagram illustrating an exemplary host computer system incorporating a PDAC of the present invention.

FIG. 2 is a block diagram showing a local host computer system 200 incorporating a PDAC 100 of the present invention. The computer system 200 includes one or more processors, such as a processor 204. The processor 204 is connected to a communication infrastructure 212, e.g., a communications bus, cross-over bar, or network. Various software embodiments are described in terms of this exemplary computer system 200. After reading this description, it will become apparent to a person of ordinary skill in the relevant art(s) how to implement the invention using other computer systems and/or computer architectures.

The computer system 200 includes a display interface 208 that forwards graphics, text, and other data from the communications infrastructure 212 (or from a frame buffer not shown) for display on the display unit 210, e.g., a computer screen or monitor on which a graphical user interface, including a window environment, may be displayed. The display interface 208 can also include one or more input peripherals, including, for example, a keyboard, a mouse, a light pen, a pressure-sensitive screen, etc., which provide a user with the capability of entering such input to the computer system 200.

The computer system 200 also includes a main memory 206, preferably random access memory (RAM), and may also include a secondary memory 214. The secondary memory 214 may include, for example, a hard disk drive 216 and/or a removable storage drive 218, representing a floppy disk drive, a magnetic tape drive, an optical disk, a compact disk drive, etc. which is read by and written to by a removable storage unit 220. The removable storage unit 220, also called a program storage device or a computer program product, represents a floppy disk, magnetic tape, optical disk, compact disk, etc. As will be appreciated, the removable storage unit 220 includes a computer usable storage medium having stored therein computer software and/or data. The removable storage drive 218 reads from and/or writes to a removable storage unit 220 in a well known manner.

In alternative embodiments, secondary memory 214 may also include other similar means for allowing computer programs or other instructions to be loaded into the computer system 200. Such means may include, for example, an interface 222 and a removable storage unit 224. Examples of an interface 222 may include a program cartridge and cartridge interface (such as that found in video game devices), a removable memory chip (such as EPROM, or PROM) and associated socket, and other removable storage units 224 and interfaces 222 which allow software and data to be transferred from the removable storage unit 224 to the computer system 200.

The computer system 200 may also include a communications interface 226. Communications interface 226 allows software and data to be transferred between the computer system 200 and external devices. Examples of communications interface 226 may include a modem, a network interface (such as an Ethernet card), a communications port, a PCMCIA slot and card, etc. Software and data transferred via communications interface 226 are in the form of signals 228 which may be electronic, electromagnetic, optical, wireless or other signals capable of being received by communications interface 226. These signals 228 are provided to communications interface 226 via a communications path (i.e., channel) 230. This channel 230 carries signals 228 and may be implemented using wire or cable, fiber optics, a phone line, a cellular phone link, an RF link and other communications channels 230.

In the preferred embodiment, a Client Interface Program (CIP) executes within the computer system 200 interfacing with the host computer system's 200 operating system, the HCP software of the PDAC 100, and a Network Administrator Program (NAP) executing on a network server when the host computer system 200 is incorporated into a network environment. The NAP will be described in greater detail below. In the preferred embodiment, the CIP is stored on a floppy disk and executed by the host computer system 200 via a removable storage unit 220.

In this document, the term "computer program medium" and "computer usable medium" are used to generally refer to media such as removable storage unit 220, 224, a hard disk installed in hard disk drive 216, and signals 228. These "computer program products" are means for providing software, e.g., the CIP, to a host computer system 200.

Portions of the present invention are directed to such computer program products, including the CIP, HCP, and NAP software as described herein. It would be readily apparent for one of ordinary skill in the relevant art to design and implement the described software comprising the CIP, HCP, and NAP. The preferred embodiment of the software is written using the Java and assembly programming languages, but this is for convenience purpose only. Any comparable programming language may be used; e.g., C++.

Computer programs (also called computer control logic) are stored in main memory 206 and/or secondary memory 214. Computer programs may also be received via communications interface 226. Such computer programs, when executed, enable the host computer system 200 to perform the features of the present invention as discussed herein. In particular, the computer programs, when executed, enable the processor 204 to perform the features of the present invention. Accordingly, such computer programs represent controllers of the computer system 200.

In an embodiment where portions of the invention are implemented using software, the software may be stored in a computer program product and loaded into host computer system 200 using removable storage drive 218, a hard disk drive 216, or communications interface 226. The software, when executed by the processor 204, causes the processor 204 to perform the functions of the invention as described herein.

In another embodiment, the invention is implemented primarily in hardware using, for example, a hardware state machine, such as application specific integrated circuits (ASICS). Implementation of the hardware state machine so as to perform the functions described herein will be apparent to persons skilled in the relevant art(s).

In yet another embodiment, the invention is implemented using a combination of hardware and software.

The preferred embodiment of the present invention is directed to execute on a host computer system 200 using MicroSoft Windows operating system. Windows is commercially available and is well known in the relevant arts. The preferred host computer system 200 is an IBM compatible personal computer but the present invention also can be developed on a sun workstation or mainframe computer. The present invention is described in terms of a host computer system 200 having a single processor 204 for convenience purposes only. It would be readily apparent, however, to one skilled in the relevant arts to use a host computer system 200 having multiple processors 204, thereby executing the present invention in parallel. The preferred embodiment of the present invention is implemented in software, and more specifically, is written in the programming language Java. The preferred embodiment is described in these terms for convenience purpose only. Other comparable host computer systems 200, operating systems, and programming languages could alternatively be used.

The operating system of the host computer system 200 of the present invention is directed to a windows environment, with the preferred embodiment being a Windows NT environment. In an alternative environment where a command line interface is desired, then the Linux operating system is the preferred embodiment. The present invention is described in terms of a Windows NT and Linux environment for convenience purpose only. It would be readily apparent that any comparable operating system could be used.

The preferred host computer system 200 also employs a system using RISC architecture, but the present invention also can be developed on a personal or mainframe computer.

The present invention is described in terms of a host computer system 200 having a single processor 204 for convenience purposes only. It would be readily apparent, however, to one skilled in the relevant arts to use a host computer system 200 having no processor 204 (Oust using the processor 102 of the PDAC 100) or multiple processors 204 to execute the present invention in parallel. There are no memory requirements for developing and executing the present invention. However, the host computer system 200 achieves better performance with more main memory 206 and secondary memory 214.

In an alternative embodiment, the PDAC 100 is not incorporated within a host computer system 200, but rather is designed and operated as an external device connected to a host computer system 200 via a universal serial bus (USB) or IEEE-1394 (firewire). The use of a USB or firewire is for example purpose only; any comparable interface can be used. Other than this external connection, all other features and functions of a PDAC 100 of the present invention remain the same as described herein. Furthermore, it would be readily apparent for one of ordinary skill in the relevant art to design and use an external PDAC 100. This external embodiment and use of a PDAC 100 has many advantages in that a user can simply plug the external PDAC 100 into any host computer system 200 and access it via a CIP executing from a floppy disk. For example, a user may use an external PDAC 100 in decoding an encryption code in that the decryption can be distributed across multiple processors 102 on the PDAC 100, thereby improving performance speed.

B. System Overview

Figure 3:
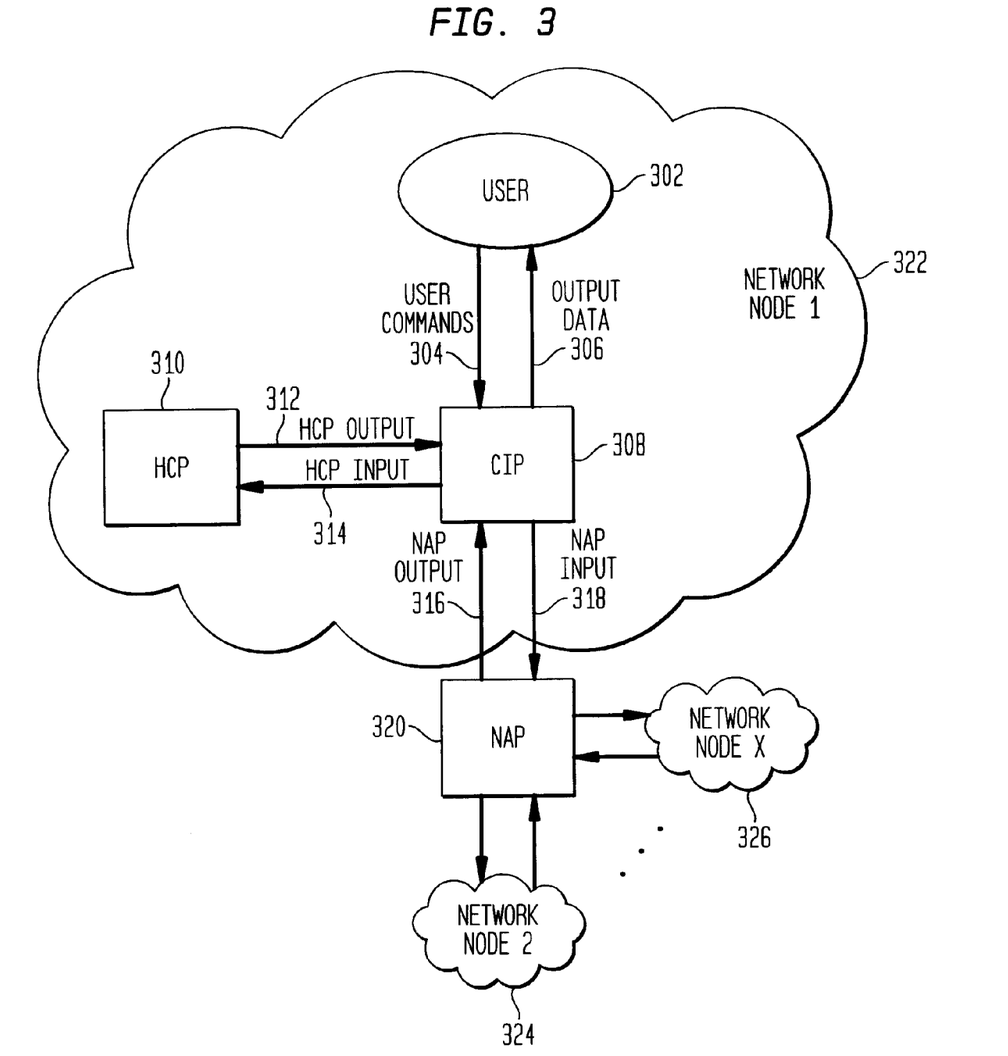
FIG. 3: A block diagram illustrating the data flow communications between the software components of the present invention.

FIG. 3 is a block diagram illustrating the data flow communications between the software components of the present invention. As discussed, the present invention comprises three software components: a client interface program (CIP) 308 executing within a host computer system 200, a host control program (HCP) 310 executing on a PDAC 100, and a network administrator program (NAP) 320 executing on a network server. Initially, the PDAC 100 of the present invention is discussed as used in a stand alone host computer system 200 that is not connected to a network. The use of a PDAC 100 within a network environment is discussed below.

When a User 302 desires to access a PDAC 100, he/she inserts a floppy disk into the removable storage unit 220 of the host computer system 200 on which the CIP 308 is stored. The CIP 308 may be stored on, and booted from, a floppy disk or, in the alternative, an EEPROM 108 on a PDAC 100. If on a floppy disk, a host computer system 200 would not require any EEPROMs 108 installed on the PDAC 100 because the host computer system 200 receives software applications stored on EEPROMs contained in a firmware administration box (FAB), which is described in detail below. In other alternative embodiments, the CIP 308 may be stored on any type of removable media, e.g., optical disk or the like. It would be readily apparent to one of ordinary skill in the relevant art to use a different type of removable media for the CIP 308.

At boot up, the CIP 308 determines if a PDAC 100 exists and if one does, the CIP 308 sends HCP Input 314 to the HCP 310 of the PDAC 100. The HCP Input 314 comprises various startup information, e.g., whether the host computer system 200 is connected to a network and user defined tasks such as when a User 302 intervenes in an executing software application to execute a file operation (e.g., open, save, close, etc.). After initializing the PDAC 100 at start up, the HCP 310 returns HCP Output 312 to the CIP 308 comprising startup information, e.g., hardware serial numbers, identification codes, and software application information.

When the CIP 308 has received information regarding all of the PDACs 100 that may be incorporated into the host computer system 200, the CIP 308 outputs a menu to the User 302 via Output Data 306 listing the different software applications available on the resident PDACs 100. The User 302 selects a software application and sends his/her selection back to the CIP 308 via User Commands 304. The CIP 308 then transmits the request, as a HCP Input 314, to the appropriate HCP 310.

Upon command, the HCP 310 of a PDAC 100 loads the resident software application which executes until completion. During the operation of the software application, the HCP 310 interfaces with the CIP 308 (via HCP Input 314 and HCP Output 312) in terms of receiving User Commands 304 from the User 302 and displaying results from the software application to the User 302 as Output Data 306.

The CIP 308 also acts as a traffic cop between the host computer system's 200 operating system and resources, and a resident PDAC 100. This function is transparent to the User 302. When the HCP 310 of a PDAC 100 requests resources from the host computer system 200, the CIP 308 must approve the request. The CIP 308 also manages User 302 oriented functions such as remote dial-up and messaging capabilities. The CIP 308 will also give the User 302 an option to export to other PDAC 100 equipped machines.

A User 302 also at his/her disposal a "short-cut" to the CIP 308 which acts as a software "on/off switch" of sorts. When the User 302 starts the CIP 308, a user-interface window opens that allows character input/output. The CIP 308 is mouse-aware as well as line command driven. The use of a mouse in the preferred embodiment is for convenience purpose only. It would be readily apparent to one of ordinary skill in the art to use another method of data input, including but not limited to, a digitizer tablet, light pen, pressure-sensitive screen, and the like. In an alternative embodiment, the user-interface window of the CIP 308 provides the User 302 with video and/or sound output. However, to provide such capabilities, the host computer system 200 must have installed the necessary and appropriate hardware components. Video and sound hardware components are commercially available. It would be readily apparent to one of ordinary skill in the relevant art to install such hardware and make it operational with the present invention.

When the host computer system 200 is part of a network environment, a NAP 320 is used on the network server for monitoring network resources. That is, the NAP 320 interfaces with two or more network nodes 322, 324, 326, wherein each network node 322, 324, 326 represents a different host computer system 200 having one or more PDACs 100 in other network nodes 322, 324, 326. When a network node 322, 324, 326 comes on-line with the server, the CIP's 308 of each network node 322, 324, 326 registers its PDAC 100 software applications with the NAP 320. The CIP 308 will also query the NAP 320 to determine the software applications available via remote PDACs 100. Then, upon displaying a menu of available PDAC 100 software applications to a User 302, the CIP 308 will include the available software application from its local PDACs 100 as well as the available remote software applications from remote PDACs 100. If a User selects a remote software application, the CIP 308 interfaces with the NAP 320, via NAP Input 318 and NAP Output 316, for access to the selected remote software application.

The NAP 320 controls access and security rights to remote PDAC 100 software applications, or network "objects," for which it is constantly searching. To the NAP 320, even an HCP 310 is an object. This (and the CIP's 308 export function) allows for application sharing. The NAP 320 tracks and administers resources and provides access to licenses of existing PDAC 100 software applications. The NAP 320 is important because it will enable the network to function, at times, like a peer-to-peer network as well as a client server network.

In the preferred embodiment, the data transfer between the CIP 308 and the HCP 310 of a PDAC 100 also depends on the installation configuration employing the PDAC 100. If the PDAC 100 is incorporated in a host computer system 200 only, data transfer between the CIP 308 and the HCP 310 of the resident PDAC 100 occurs in a bit-by-bit format. In contrast, when the host computer system 200 having a PDAC 100 is connected to a network, the data transfer between the CIP 308 and the NAP 320 (when accessing a remote PDAC 100) is a data packet format. When the User wishes to toggle between software applications (either to the host computer system's 200 operating system or a software application of a second PDAC 100), the CIP 308 will continue running, minimized, and it will display a progress indicator, depending on the application.

The HCP 310 and NAP 320 software can be entirely custom programmed or can be developed using pre-developed software programs. For example, in using available software programs, the HCP 310 can use an embedded runtime operating system, e.g., VxWorks from Wind River Systems, to create the needed operating system device drivers and input/output device drivers. If a Novell network is being used, the NAP 320 can be developed using Netware Loadable Module (NLM) software which simply plugs into the Novell network software.

Regarding the CIP 308, this program must function as an instruction set translator that translates the PDAC 100 output data (the HCP Output 312). Therefore, because the CIP 308 is so dependent on the specific data format and content, it must be custom designed to recognize that data. In the preferred embodiment, the CIP 308 is programmed using assembly code to achieve the desired speed during execution.

C. Control Flow of Software

The following detailed description describes the control, or operational, flow of the three software components of the present invention: CIP, HCP, and NAP. These components are described in terms of a host computer system 200 having a single PDAC 100 with each PDAC 100 having a single resident software application for convenience purpose only. The description is equally applicable to an environment wherein a host computer system 200 incorporates a plurality of PDACs 100 one of which having a plurality of resident software applications. Furthermore, it would be readily apparent to one skilled in the relevant art(s) to modify these software components to accommodate host computer systems 200 have a plurality of PDACs 100 with one or more PDAC 100 having a plurality of resident software applications.

1. Control Flow of the CIP Software

Figure 4:
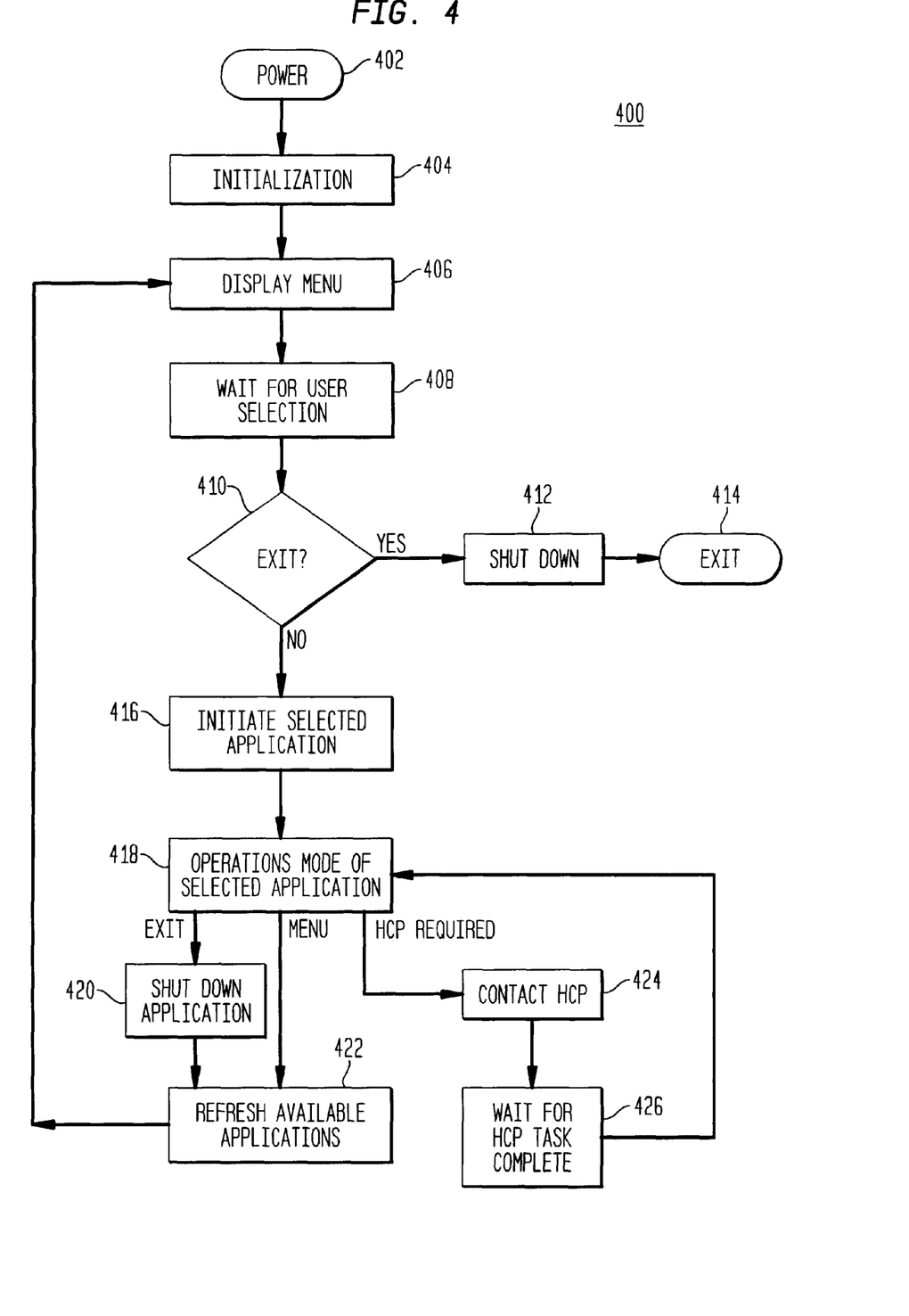
FIG. 4: A block diagram illustrating the control flow of the client interface program (CIP) software component of the present invention.
Figure 5:
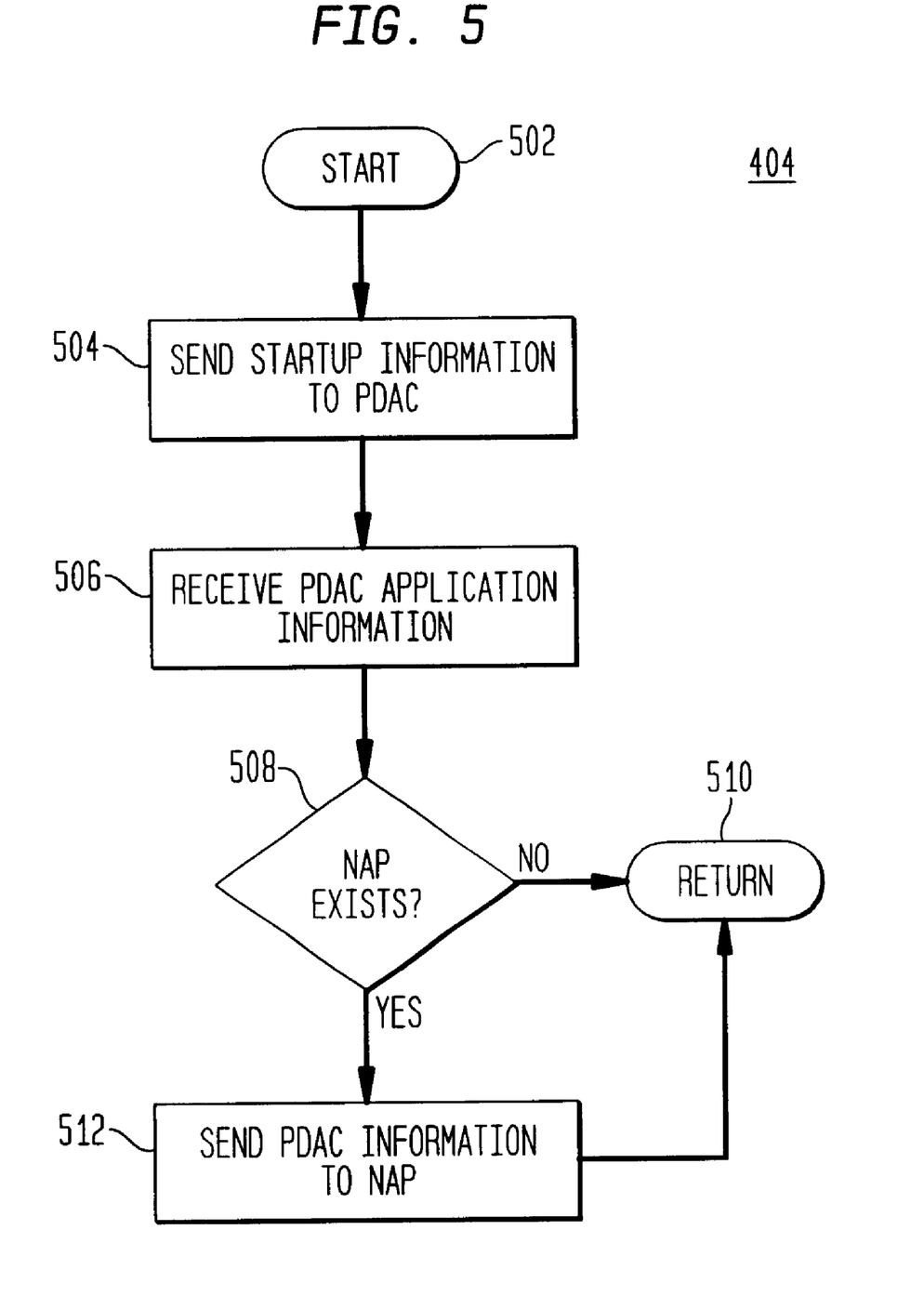
FIG. 5: A block diagram illustrating the control flow of the CIP initialization.

FIGS. 4 and 5 are block diagrams illustrating the control flow of the client interface program (CIP) 308 software component of the present invention. Operationally, the CIP 308 interfaces with the operating system of the host computer system 200 in order to execute the instructions of the HCP 310, NAP 320, and User 302. The CIP 308 provides the user interface for the software application executing on the PDAC 100, and therefore User 302 commands to the software application must be transmitted via the CIP 308.

In the preferred embodiment, the CIP 308 uses the host operating system virtual device driver (.vxd) files to access host resources, e.g., disk drives, memory, network interface card(s), etc. Also, in the preferred embodiment, the CIP 308 is on a floppy disk medium and loaded by the User 302 during boot up of the host computer system 200.

While the preferred embodiment of the CIP 308 handles PDAC 100 I/O and software application user interfaces, with some computer architectures or computer system designs it may be necessary or appropriate to separate these functions, thereby modularizing the CIP 308 on the host computer system 200. This would result in a CIP 308 that handles I/O with other PDACs 100 and the host computer system 200, and a User Interface Program (UIP) that is the software application's "front end." The UIP can be custom programmed or an off-the-shelf program may be used, e.g., a web browser. It would be readily apparent to one of ordinary skill in the relevant art to modularize the CIP 308 as described herein, as a means for improving the effectiveness of a PDAC 100.

Processing of the CIP 308 begins at step 402 when power is supplied to the host computer system 200. The CIP 308 is loaded at machine power-on (or boot-up) along with any necessary BIOS extensions and the operating system (OS). After the host computer system 200 has processed its autoexec.bat and config.sys files, the CIP 308 is loaded. Once the host computer system's 200 OS is up and running and the CIP 308 is loaded, i.e., boot-up is complete, the CIP 308 proceeds to step 404 for initialization. As part of the initialization process, the CIP 308 determines which software applications are available to the User 302 via either resident PDACs 100 or via a NAP 320 accessing remote PDACs 100. Initialization is discussed in more detail below.

After the CIP 308 completes initialization, the CIP 308 continues to step 406. In step 406, the CIP 308 displays to the User 302 those software applications that are available for access. The CIP 308 continues to step 408 wherein it waits for the User 302 selection. Once the User 302 makes a selection, the CIP 308 continues to step 410.

In step 410, the CIP 308 determines whether the User 302 wanted to exit the CIP 308 processing. If the User 302 selected the "Exit" command, the CIP 308 proceeds to step 412. In step 412, the CIP 308 shuts down the operation of the host computer system 200, including all resident PDACs 100. After the host computer system 200 is shut down, the CIP 308 continues to step 414 wherein all processing is complete and the CIP 308 exists.

Returning to step 410, if the CIP 308 determines that the User 302 did not select the "Exit" command, the CIP 308 proceeds to step 416. In step 416, the CIP 308 initiates the software application selected by the User 302. Depending on the location of the selected software application, the CIP 308 will either transmit the appropriate start up command to a HCP 310 on a resident PDAC 100 or transmit a request to the NAP 320 to start up a software application available on a remote PDAC 100. Once the selected software application is executing, the CIP 308 continues to step 418 wherein it enters the operational mode of the selected application.

In step 418, the CIP 308 enters a continuous loop waiting for and responding to requests from the HCP 310 managing the selected software application. If the HCP 310 determines that the User 302 selects the "Exit" command from the executing software application, the HCP 310 forwards the command to the CIP 308. Upon receipt of an "Exit" command, the CIP 308 continues to step 420, wherein it shuts down the executing software application. The CIP 308 continues to step 422 wherein it refreshes its list of available software applications. That is, the CIP 308 checks with the NAP 320, if one exists, and receives a new list of software applications available via remote PDACs 100. The CIP 308 combines this new list with the list of software applications available via resident PDACs 100 then returns to step 406. In step 406, the CIP 308 displays the total list of available software applications to the User 302 and processing repeats as described above.

Returning to step 418, if the CIP 308 receives a "Menu" command from the User to refresh the list of available software applications, the CIP 308 continues to step 422. Processing of step 422 continues as described above.

Returning to step 418, if the CIP 308 receives a HCP Required request from the executing software application, via the HCP 310, or from the host computer system 200 operating system, the CIP 308 proceeds to step 424. In step 424, the CIP 308 contacts the HCP 310 and issues the request. The CIP 308 continues to step 426 and waits for the requested task to complete. Once the CIP 308 receives notification from the HCP 310 that the requested task is complete, the CIP 308 returns to step 418 and waits for another command.

FIG. 5 illustrates the control flow of the CIP 308 initialization in step 404. Processing begins at step 502 and immediately proceeds to step 504. In step 504, the CIP 308 sends startup information to all PDACs 100 resident in the host computer system 200. Such startup information includes, but is not limited to, initialization flags, user defined tasks, etc. After sending the information, the CIP 308 waits for all HCP's 310 of the resident PDACs 100 to respond. In step 506, the CIP 308 receives information on the software applications of the resident PDACs 100. Such software application information may include, but is not limited to, PDAC 100 hardware serial numbers, identification codes, and software application information (version numbers, key codes, etc.). Once the CIP 308 receives the application information, the CIP continues to step 508.

In step 508, the CIP 308 determines whether the local computer system 200 is connected to a network and whether a NAP 320 exists on the network server. If either there is no network or a NAP 320 does not exist, the CIP 308 proceeds to step 510. Step 510 is described in detail below.

Returning to step 508, if the CIP 308 determines that the local computer system 200 is connected to a network and a NAP 320 exists, the CIP 308 proceeds to step 512. In step 512, the CIP 308 sends all PDAC 100 information, including information on all software application available on resident PDACs 100, to the NAP 320. This communication registers with the NAP 320 those software applications that are available on this host computer system 200. After registering with the NAP 320, the CIP 308 continues to step 510.

In step 510, all CIP 308 initialization is complete and control is returned to step 404 wherein the CIP 308 immediately continues to step 406 as described above.

2. Control Flow of the HCP Software

Figure 6:
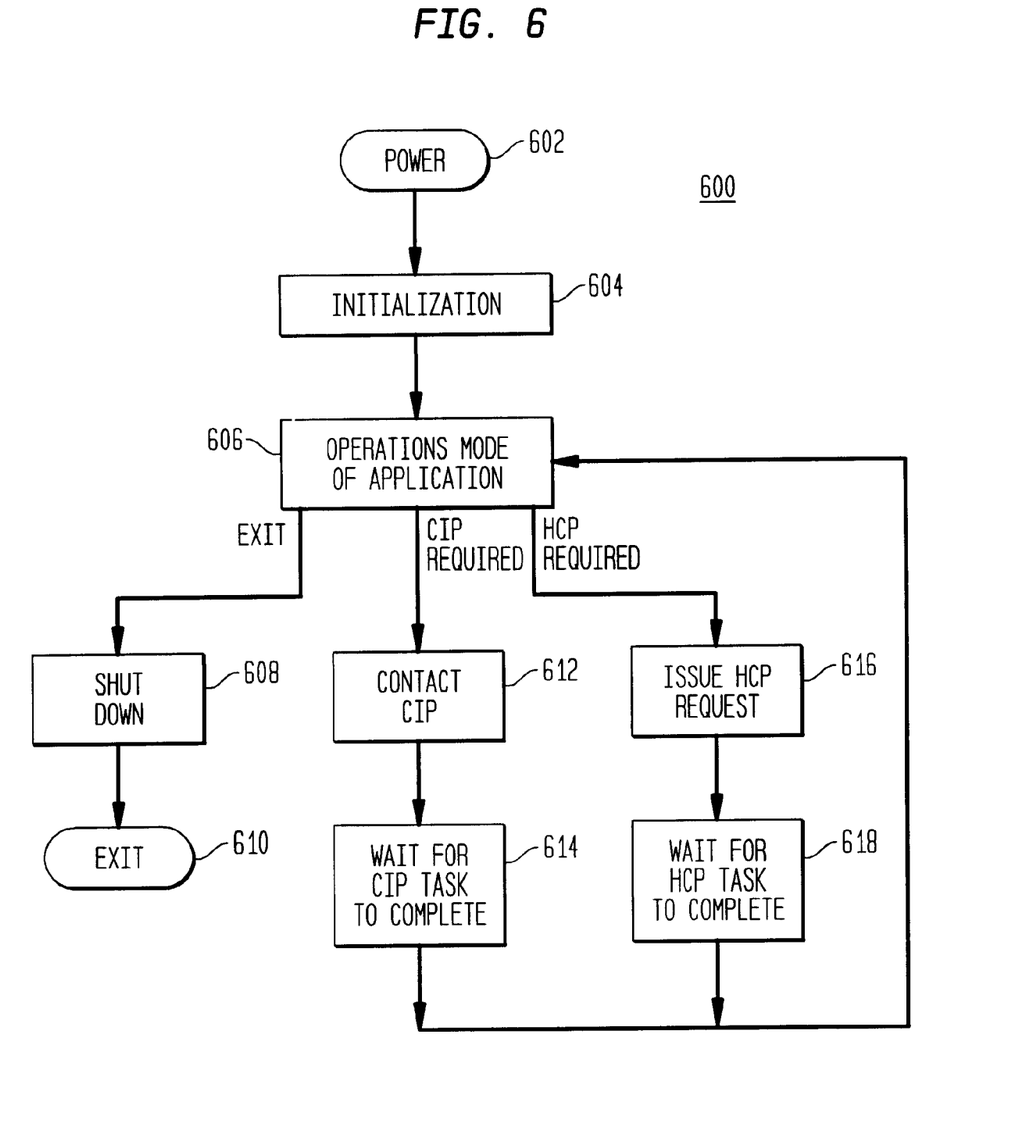
FIG. 6: A block diagram illustrating the control flow of the host control program (RCP) software component of the present invention.
Figure 7:
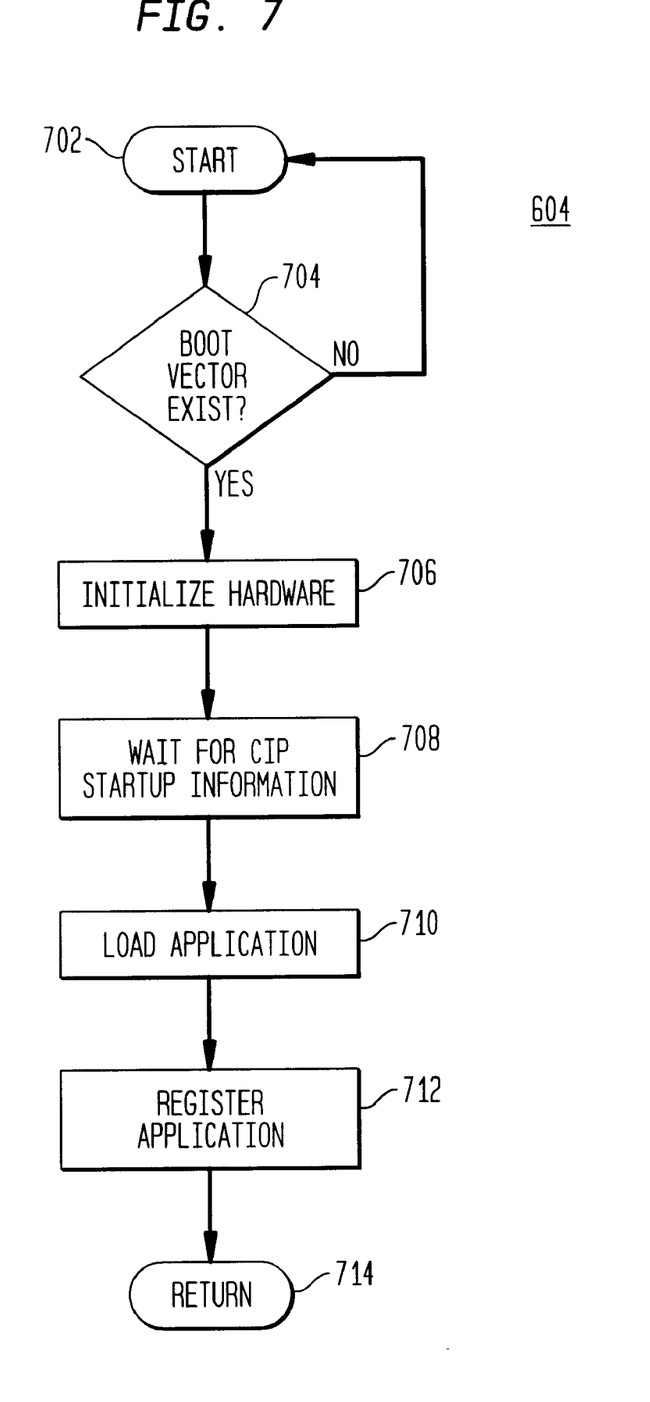
FIG. 7: A block diagram illustrating the control flow of the HCP initialztion.

FIGS. 6 and 7 are block diagrams illustrating the control flow of the host control program (HCP) 310 software component of the present invention. The HCP 310 monitors and allocates a PDAC's 100 resources based on requests from the executing resident software application and the CIP 308 of the host computer system 200. The HCP 310 communicates with the CIP 308 when necessary to carry out User 302 defined tasks (e.g., file operations, such as open, close, save, etc.) and requests for the available resources of the host computer system 200. The CIP 308 acts as the HCP's 310 interface to the host computer system's 200 operating system.

Processing of the HCP 310 begins at step 602 when power is supplied to the host computer system 200. As described above, in the preferred embodiment, the HCP 310 resides in EEPROM 108 on the PDAC 100. Therefore, when power is supplied to the PDAC 100, the HCP 310 functions as the boot ROM in a conventional computer system. Upon power-on, the HCP 310 proceeds to step 604 for initialization. As part of the initialization process, the HCP 310 initializes the PDAC 100 components and registers the resident software applications with the host computer system 200. Initialization is discussed in more detail below.

After the HCP 310 completes initialization, the HCP 310 continues to step 606. In step 606, the HCP 310 enters a continuous loop waiting for and responding to requests from the CIP 308 and managing requests it originates and sends to the CIP 308. If the HCP 310 determines that the User 302 selects the "Exit" command from the executing software application, the HCP 310 continues to step 608 wherein it shuts down the executing software application and the PDAC 100. The HCP 310 continues to step 610 wherein all processing is complete and the HCP 310 exits.

Returning to step 606, if the HCP 310 receives a CIP Required request from the executing software application, the HCP 310 proceeds to step 612. In step 612, the HCP 310 contacts the CIP 308 and issues the request. The HCP 310 continues to step 614 and waits for the requested task to complete. Once the HCP 310 receives notification from the CIP 308 that the requested task is complete, the HCP 310 returns to step 606 and waits for another command.

Returning to step 606, if the HCP 310 receives a HCP Required request from the executing software application, from the host computer system's 200 operating system, or from the CIP 308, the HCP 310 proceeds to step 616. In step 616, the HCP 310 issues the request and continues to step 618 wherein it waits for the requested task to complete. Once the HCP 310 receives notification that the requested task is complete, the HCP 310 returns to step 606 and waits for another command.

FIG. 7 illustrates the control flow of the HCP 310 initialization in step 604. Processing begins at step 702 and immediately proceeds to step 704. In step 704, the HCP 310 determines whether a boot vector exists. If a boot vector does not exist, the HCP 310 initialization has failed and processing returns to step 702 wherein the HCP 310 waits for another power up.

Returning to step 704, if the HCP 310 determines that a boot vector does exist, the HCP 310 proceeds to step 706. In step 706, the HCP 310 initializes the hardware components of the PDAC 100. Continuing to step 708, the HCP 310 waits for startup information from the CIP 308. Once the HCP 310 receives the startup information, the HCP 310 continues to step 710. In step 710, the HCP 310 loads the software application and prepares it for execution. The HCP 310 continues to step 712.

In step 712, the HCP 310 registers the software application, or multiple applications, with the CIP 308. This is accomplished by the HCP 310 sending information on the software application(s). Once the software application(s) is registered, the HCP 310 continues to step 714. In step 714, all HCP 310 initialization is complete and control is returned to step 604 wherein the HCP 310 immediately continues to step 606 as described above.

3. Control Flow of the NAP Software

Figure 8:
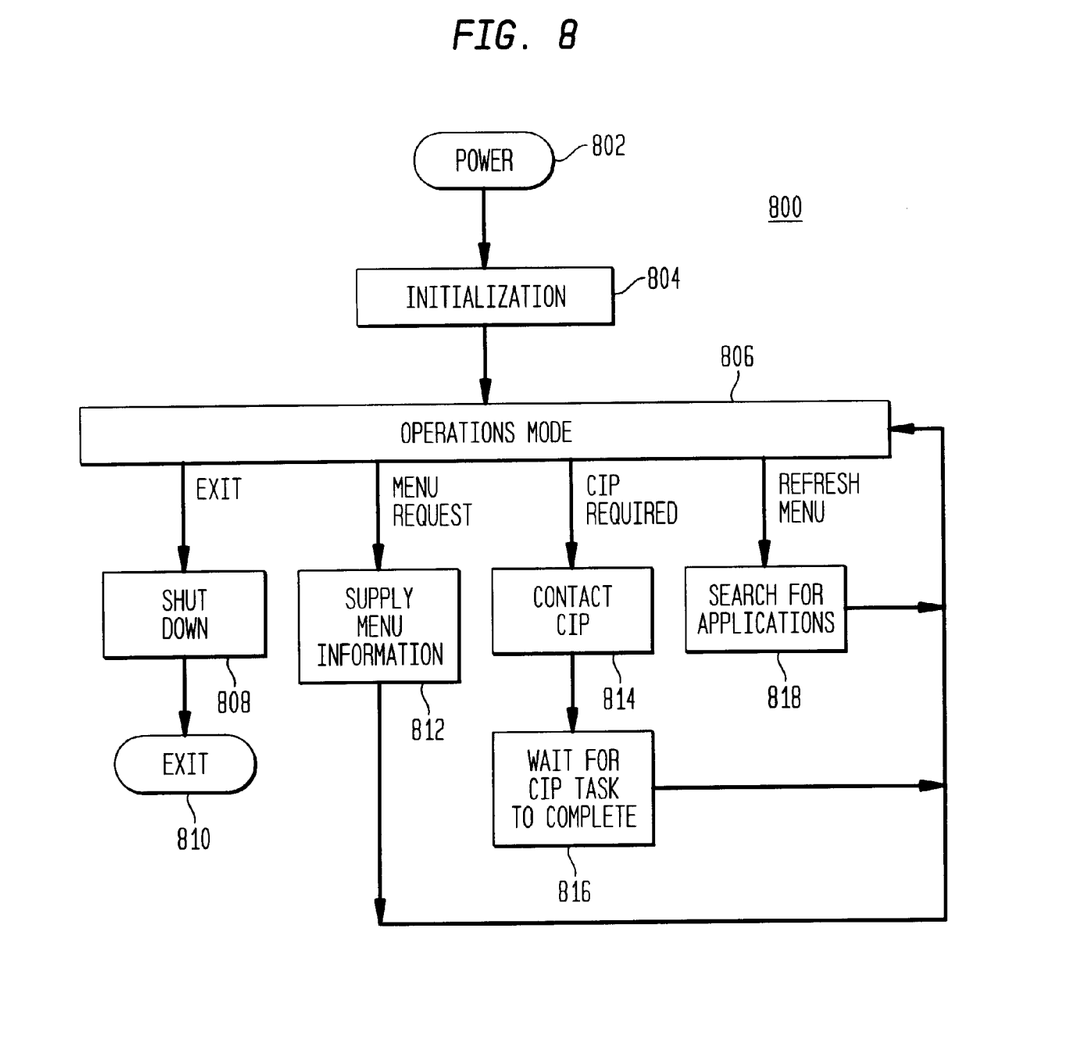
FIG. 8: A block diagram illustrating the control flow of the network administrator program (NAP) software component of the present invention.
Figure 9:
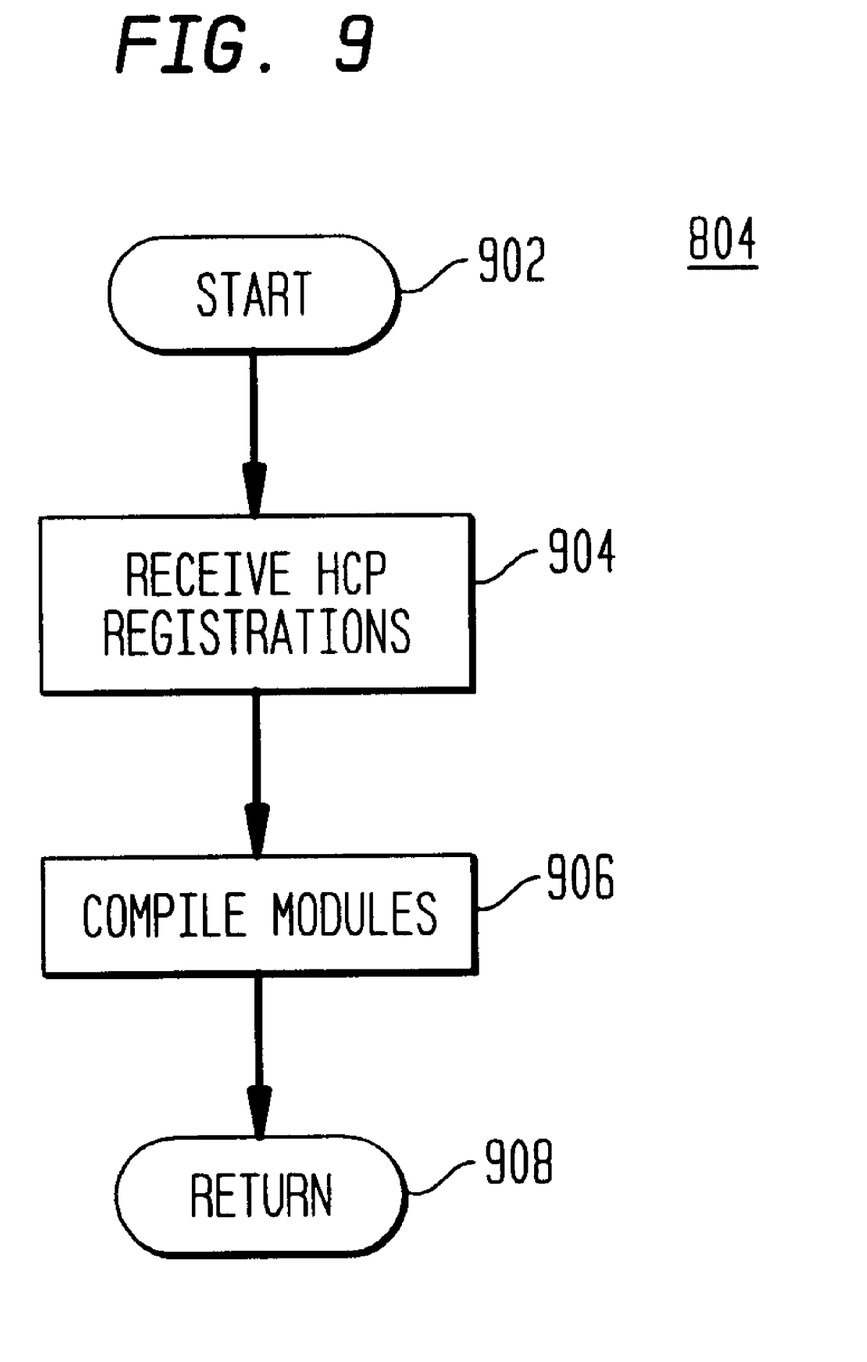
FIG. 9: A block diagram illustrating the control flow of the NAP initialization.

FIGS. 8 and 9 are block diagrams illustrating the control flow of the network administrator program (NAP) 320 software component of the present invention. Processing of the NAP 320 begins at step 802 when power is supplied to the server. Upon power-on, the NAP 320 proceeds to step 804 for initialization. As part of the initialization process, the NAP 320 receives information on all software applications available from remote PDACs 100. Initialization is discussed in more detail below.

After the NAP 320 completes initialization, the NAP 320 continues to step 806. In step 806, the NAP 320 enters a continuous loop waiting for and responding to requests from the CIPs 308 in the network and allocating available network resources based on those requests. If the NAP 320 determines that an "Exit" command has been entered, the NAP 320 continues to step 808 wherein it shuts down its processing. The NAP 320 continues to step 810 wherein all processing is complete and the NAP 320 exits.

Returning to step 806, if the NAP 320 receives a "Menu" request, the NAP 320 proceeds to step 812. In step 812, the NAP 320 accesses its current list of available software applications via remote PDACs 100 and supplies the menu information for display to the CIP 308 requesting the information. Once the information is transmitted, the NAP 320 returns to step 806 and waits for another command.

Returning to step 806, if the NAP 320 receives a CIP Required request, such as when the NAP 320 is searching for available software applications, the NAP 310 proceeds to step 814. In step 814, the NAP 310 contacts the appropriate remote CIP 308 and issues the request. The NAP 320 continues to step 816 and waits for the requested task to complete. Once the NAP 320 receives notification from the remote CIP 308 that the requested task is complete, the NAP 320 returns to step 806 and waits for another command.

Returning to step 806, if the NAP 320 receives a "Refresh Menu" request, the NAP 320 proceeds to step 818. In step 818, the NAP 320 loops through all of the remote CIPs 308 and determines what software applications are available on each CIP's 308 PDACs 100. Once the NAP 320 receives updated information from each CIP 308 and its menu information is updated, the NAP 320 returns to step 806 and waits for another command.

FIG. 9 illustrates the control flow of the NAP 320 initialization in step 804. Processing begins at step 902 and immediately proceeds to step 904. In step 904, the NAP 320 receives the HCP 310 registrations and updates its list of available software applications via remote PDACs 100. The NAP 320 continues to step 906 wherein it compiles the list of available software applications into modules.

Once the NAP 320 generates the modules, the NAP 320 continues to step 908. In step 908, all NAP 320 initialization is complete and control is returned to step 804 wherein the NAP 320 immediately continues to step 806 as described above.

D. Alternative Embodiment

In addition to the above functionality, an alternative embodiment of the present invention comprises a firmware administration box (FAB) that contains a series of EPROMs 106 each having at least one resident software application and associated licenses. The FAB is connected to the network as a separate resource node and interfaces with the NAP 320 in a manner similar to a CIP 308. Operationally, when the NAP 320 receives the initial registration of available remote software applications (step 904) or searches for the available remote software application (step 818) in an effort to refresh the menu, the NAP 320 queries the FAB along with its queries to the CIPs 308 in the network. It would be readily apparent for one skilled in the relevant art to design and implement a FAB based on the details provided herein regarding the PDAC 100, CIP 308, HCP 310, and NAP 320. The principal advantage of a FAB is that it enables a User 302 of a host computer system 200 that does not have a resident PDAC 100 to access and use remote PDAC 100 functionality, thereby maximizing the leverage of existing technology.

CONCLUSION

While various embodiments of the present invention have been described above, it should be understood that they have been presented by way of example only, and not limitations. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. A programmable dedicated application card for use with a host computer system having a host processor and host memory, comprising:

a first non-volatile memory;

a software application stored in said first non-volatile memory;

random access memory;

a second non-volatile memory;

a processor for executing said software application using said random access memory;

a means for communicating said first non-volatile memory, said random access memory, said second non-volatile memory, and said processor;

a means for seamlessly controlling the programmable dedicated application card and interfacing said software application of the programmable dedicated application card with the host computer system; and a means for translating an instruction set from said host computer system such that said processor executes said instruction set.

2. The programmable dedicated application card according to claim 1, wherein said means for controlling and interfacing resides in said second non-volatile memory.

3. The programmable dedicated application card according to claim 1, wherein said first non-volatile memory and said second non-volatile memory are selected from the group of EPROM, EEPROM, Flash RAM, Ferro-electric RAM, and battery-backed RAM.

4. The programmable dedicated application card according to claim 1, wherein said processor is a reduced instruction set code processor.

5. The programmable dedicated application card according to claim 1, wherein said means for controlling and interfacing comprises:

a means for initializing the programmable dedicated application card;

a means for registering said software application with the host computer system;

a means for loading said software application for execution; and a means for operating said software application.

6. The programmable dedicated application card according to claim 5, wherein said means for operating said software program comprises:
   a means for processing user commands; and
   a means for processing hardware requests.

7. The programmable dedicated application card according to claim 1, wherein said means for controlling and interfacing is a host control program.

8. A programmable dedicated application card for use with a host computer system having a host processor and host memory, comprising:
   a first non-volatile memory capable of storing a software application;
   random access memory;
   a second non-volatile memory;
   a processor for executing a software application stored in said first non-volatile memory using said random access memory;
   a means for communicating said first non-volatile memory, said random access memory, said second non-volatile memory, and said processor;
   a means for seamlessly controlling the programmable dedicated application card and interfacing said software application of the programmable dedicated application card with the host computer system, wherein said means for controlling and interfacing resides in said second non-volatile memory; and
   a means for translating an instruction set from said host computer system such that said processor executes said instruction set.

9. A host control program computer program product for use with a programmable dedicated application card in communication with a host computer system, the programmable dedicated application card having a first non-volatile memory, a software application stored in the first non-volatile memory, random access memory, a second non-volatile memory, a processor for executing the software application using the random access memory, comprising:
   the second non-volatile memory having computer readable program code means embodied in said second non-volatile memory for controlling the programmable dedicated application card and interfacing the programmable dedicated application card with the host computer system, said computer readable program code means comprising:
      initializing means for enabling the processor to initialize the programmable dedicated application card;
      translating means for enabling the processor to translate an instruction set from the host computer system such that the processor executes said instruction set; and
      operating means for enabling the processor to operate the software application.

10. The host control program computer program product according to claim 9, wherein said operating means comprises:
    first processing means for enabling the processor to process user commands; and
    second processing means for enabling the processor to process hardware requests.

11. The host control program computer program product according to claim 9, wherein said first non-volatile memory and said second non-volatile memory are selected from the group of EPROM, EEPROM, Flash RAM, Ferro-electric RAM, and battery-backed RAM.

12. The host control program computer program product according to claim 9, wherein said processor is a reduced instruction set code processor.

13. The host control program computer program product according to claim 9, wherein said initializing means comprises:
    second initializing means for enabling the processor to initialize the hardware of the programmable dedicated application card;
    loading means for enabling the processor to load the software application for execution; and
    registering means for enabling the processor to register the software application with the host computer system.

14. A client interface program computer program product for use with one or more programmable dedicated application cards in communication with a host computer system, comprising:
    a computer program medium having computer readable program code means embodied in said computer program medium for interfacing with the host computer system and said one or more programmable dedicated application cards, each said programmable dedicated application card having a first non-volatile memory, a software application stored in said first non-volatile memory, random access memory, a second non-volatile memory, a processor for executing said software application using said random access memory, said computer readable program code means comprising:
       interfacing means for enabling the host computer system to interface with a user;
       initiating means for enabling the host computer system to initiate said software application of one said programmable dedicated application card; and
       operating means for enabling the host computer system to operate said software application of one said programmable dedicated application card.

15. The client interface program computer program product according to claim 14, further comprising:
    displaying means for enabling the host computer system to display a list of said software applications of said programmable dedicated application cards; and
    receiving means for receiving a selection from the user of one said software application to execute.

16. The client interface program computer program product according to claim 14, wherein said operating means comprises:
    receiving means for enabling the host computer system to receive a command for one said software application from the user; and
    sending means for enabling the host computer system to send said command to said programmable dedicated application card of said software application.

17. The client interface program computer program product according to claim 14, further comprising:
    initializing means for enabling the host computer system to initialize the programmable dedicated application card.

18. The client interface program computer program product according to claim 17, wherein said initializing means comprises:
    sending means for enabling the host computer system to send start up information to each said programmable dedicated application card; and
    receiving means for enabling the host computer system to receive registration information from each said programmable dedicated application card.

19. The client interface program computer program product according to claim 18, wherein said initializing means further comprises:
  determining means for enabling the host computer system to determine whether the host computer system is connected to a computer network; and
  registering means for enabling the host computer system to register said software application of each said programmable dedicated application card with the computer network.

20. The client interface program computer program product according to claim 14, wherein said computer program medium is a removable storage unit selected from the group of floppy disk, magnetic tape, optical disk, and compact disk.

21. A network administrator program computer program product for use on a server having a processor and for connecting two or more host computer systems, comprising:
  a computer program medium having computer readable program code means embodied in said computer program medium for interfacing with each host computer system, each host computer system having one or more programmable dedicated application cards, each said programmable dedicated application card having a first non-volatile memory, a software application stored in the first non-volatile memory, random access memory, a second non-volatile memory, a processor for executing said software application using said random access memory, said computer readable program code means comprising:
    initializing means for initializing the network administrator program computer program product; and
    operating means for enabling the processor of the server to respond to a client interface program computer program product of each host computer system, wherein the client interface program computer program product manages each said programmable dedicated application card of each host computer system.

22. The network administrator program computer program product according to claim 21, wherein said initializing means comprises:
  receiving means for enabling the processor of the server to receive registration information from each said programmable dedicated application card of each host computer system of the computer network.

23. The network administrator program computer program product according to claim 21, wherein said operating means comprises:
  receiving means for enabling the processor of the server to receive requests from said client interface program computer program product of each host computer system; and
  responding means for enabling the processor of the server to respond to said requests.

24. The network administrator program computer program product according to claim 23, wherein said requests are selected from the group of menu request and client interface program computer program product request.

25. A method for operating a software application on a programmable dedicated application card, comprising the steps of:
  a. initializing one or more programmable dedicated application cards that are in communication with a host computer system, each said programmable dedicated application card having a first non-volatile memory, a software application stored in said first non-volatile memory, random access memory, a second non-volatile memory, a processor for executing the software application using the random access memory, a means for communicating said first non-volatile memory, said random access memory, said second non-volatile memory, and said processor, a means for seamlessly controlling said programmable dedicated application card and interfacing the software application of said programmable dedicated application card with a host computer system, and a means for translating an instruction set from said host computer system such that said processor executes said instruction set;
  b. receiving a command for one said software application from a user; and
  c. executing said command.

26. The method according to claim 25, further comprising the steps of:
  d. displaying a list of said software applications of said programmable dedicated access cards to the user; and
  e. receiving a selection from the user of one said software application to execute.

27. The method according to claim 25, further comprising the step of:
  d. registering each said software application of each said programmable dedicated application card with the host computer system.

28. The method according to claim 25, further comprising the step of:
  d. determining whether the host computer system is connected to a computer network;
  e. registering each said software application of each said programmable dedicated application card with the computer network; and
  f. receiving commands for executing one said software application from the computer network.

29. A method for manufacturing a programmable dedicated application card, comprising the steps of:
  a. creating a programmable dedicated application card having a first non-volatile memory, random access memory, a second non-volatile memory, a processor, and a means for translating an instruction set from a host computer system such that said processor said instruction set; and
  b. loading a software application into said first non-volatile memory of said programmable dedicated application card;
  wherein said processor of said programmable dedicated application card executes said software application using the random access memory.

* * * * *